June 2, 1964

A. J. GRANBERG 3,135,114

AIR ELIMINATOR

Filed Feb. 6, 1961

INVENTOR.
ALBERT J. GRANBERG
BY
*Bruce & Broeler*
HIS ATTORNEYS

June 2, 1964  A. J. GRANBERG  3,135,114
AIR ELIMINATOR

Filed Feb. 6, 1961  2 Sheets-Sheet 2

INVENTOR.
ALBERT J. GRANBERG
BY
Bruce & Brosler
HIS ATTORNEYS

United States Patent Office 3,135,114
Patented June 2, 1964

3,135,114
AIR ELIMINATOR
Albert J. Granberg, 6001 Rockwell St., Oakland, Calif.
Filed Feb. 6, 1961, Ser. No. 87,373
5 Claims. (Cl. 73—200)

My invention relates to the metering of liquids, and more particularly to the prevention of air entering a meter and impairing the accuracy thereof, and will be described in connection with the dispensing and metering of gasoline and other liquid petroleum products from a compartmentized tank truck to the underground storage tank of a service station, though the invention is not restricted in its utility to such use.

In the distribution of gasoline, oil, and the like, the same may be discharged from a tank truck, as when supplying the underground storage tank of a service station for subsequent sale to customers. Each such truck may involve a compartmentized tank, each of which compartments may be valve controlled to selectively permit dispensing of liquid therefrom through a meter to a hose line. Suitable means is usually associated with the meter to remove air from the liquid prior to its reaching the meter, so as to avoid false readings during a metering period.

It has been found, however, that errors in the meter readings are often introduced at the very start of the dispensing period, the cause being traced to the fact that at the very moment a discharge from a compartment of the truck tank is started, the initial flow carries with it through the meter, a substantial amount of air which, due to leaks or other causes, may have accumulated in the line since the previous discharge period. Similar phenomenon may likewise be experienced as when one of the compartments of the truck tank is emptied and another compartment is switched into the system.

Among the objects of the present invention are:

(1) To provide novel and improved means for preventing air from flowing through a meter in a liquid metering system;

(2) To provide novel and improved means for shutting off flow of liquid under conditions when a substantial amount of air is approaching a meter in the system;

(3) To provide a novel and improved liquid metering system.

Additional objects of my invention will be brought out in the following description of a preferred embodiment of the same, taken in conjunction with the accompanying drawings wherein.

Figure 1:
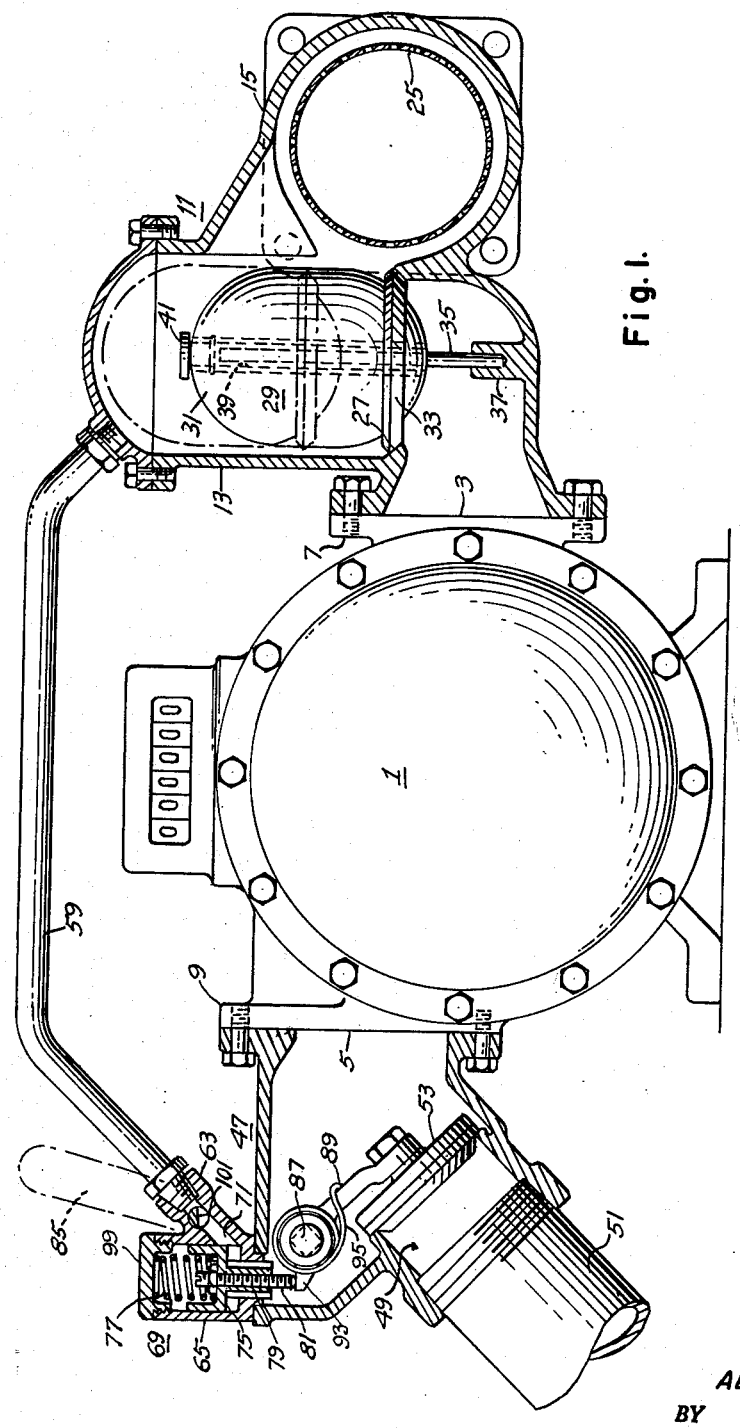
FIG. 1 is a plan view of that portion of a liquid dispensing and metering system in which the present invention lies.
Figure 3:
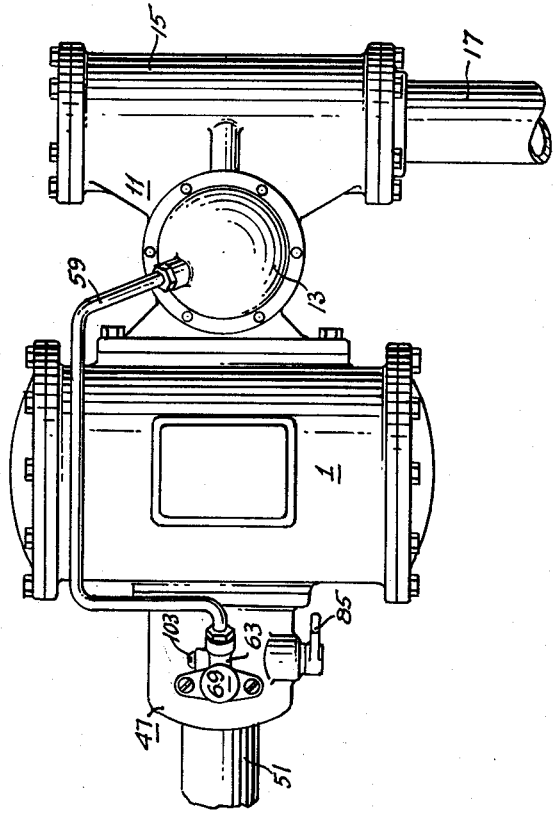
FIG. 3 is a plan view of a pressure equalizing valve assembly.
Figure 2:
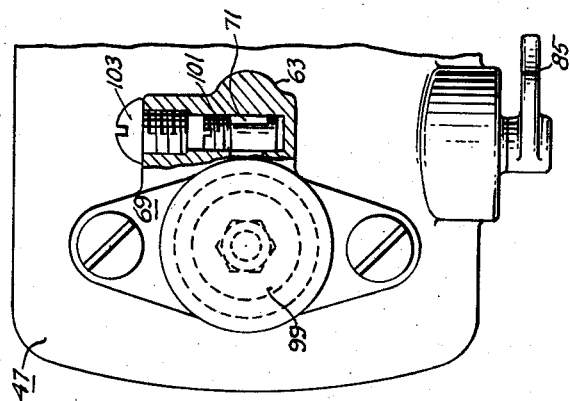
FIG. 2 is a side view in elevation of that portion of the system depicted in FIG. 1, with portions thereof in section to expose internal features thereof, pertinent to the present invention.

Referring to the drawings for details of my invention in its preferred form, the liquid metering system of the present invention comprises a liquid meter 1 having an intake opening 3 and a discharge opening 5, each bounded by a flange 7 and 9 respectively. An air separator 11 is coupled to the meter about its intake opening, such air separator including a float housing 13 and a strainer housing 15, together providing a flow passageway therethrough to the meter from a pipe connection 17 which would normally lead from a manifold not shown to which each compartment of a truck tank would be connected through an associated valve.

In the strainer housing is a basket type strainer 25 through which the liquid must pass in order to permit separation therefrom of any debris which may have been gathered up by the liquid at some previous time.

In the float housing 13 transversely of the passageway therethrough, is a valve seat 27, which in the preferred embodiment of the invention, lies in a substantially horizontal plane, for receiving a float valve assembly 29 involving a float 31 about the lower end portion of which is a tapered collar 33 of a diameter corresponding to the diameter of the valve seat, the ball and collar together constituting a valve adapted to rise and fall with liquid level in the float chamber, and block the flow passage therethrough when the liquid level drops sufficiently to permit seating of the valve upon its valve seat.

To assure proper guidance in the movement of the valve with such rise and fall of the liquid level, a fixed vertical guide rod 35 is anchored at its lower end in a boss 37 provided in the lower end or floor of the float housing, and the float is constructed with an axial passageway 39 adapted to receive the guide rod and permit vertical sliding movement of the float on such rod.

The upper end of the float may be provided with a bumper disk 41 adapted to engage the upper end or roof of the float housing should the liquid level in the float housing rise sufficiently to cause such engagement to take place.

Coupled to the meter about the meter discharge opening, is a hose fitting 47 which defines a chamber having an opening 49 for connection thereto of a discharge hose 51. Within the fitting chamber is a disc type valve 53 adapted to seat across and block said opening and thereby intercept and block any flow of liquid from the meter to the discharge hose.

Connecting the interior of the float housing 13 to the fitting chamber is a pressure equalizing passageway provided by a section of tubing 59 which is connected at one end to the upper end of the float housing, and coupled at its other end to an arm 63 of a housing 65 forming a component of a pressure equalizing valve assembly 69 mounted in a wall of the fitting, the arm 63 having a passage 71 therethrough to the interior of the housing 65 to thereby complete the pressure equalizing passageway from the float housing to the fitting chamber.

Such pressure equalizing valve assembly 69 includes a piston 75 within said housing, with a spring 77 backing up the piston and normally urging the same toward the anchored end of the valve housing, where such piston can function as a valve to block the pressure equalizing passageway.

Extending from the piston valve into the fitting chamber, is an integral internally threaded valve stem 79 adapted to threadedly receive an adjusting screw 81 through which to actuate the piston valve against the action of its backing spring 77, to a position which will open and expose the pressure equalizing passageway. The stem is externally grooved to permit flow from the passage 71 into the host fitting chamber.

Actuation of the pressure equalizing piston valve to its open position simultaneously with the closing of the opening from the fitting to the discharge hose, is provided for from a point external to the fitting, by means of a handle 85 mounted on a shaft 87 journaled in opposing walls of the fitting.

Within the fitting chamber, a lever 89 extending from the shaft 87 is connected to the valve 53 associated with the discharge hose opening, and through manipulation of the handle 85, the valve may be manually opened and closed. Associated with the shaft 87 and preferably integral with the lever 89 is a lift cam 93 extending to a point beneath the adjusting screw 81 and in contact with the lower end thereof. A hook spring 95 anchored at one end to an internal wall of the fitting chamber and extending about the lever 89, serves to normally urge the discharge hose valve 53 and the pressure equalizing valve 75 to the positions depicted in the drawings.

Adjustments of the screw may be effected through the upper end of the housing 65 of the pressure equalizing valve assembly 69, and for this purpose, the upper end of such housing is preferably made removable by providing a screw threaded cap 99 at this end. Or in the alternative, the piston 75 may be removed to make such adjustment and then replaced.

From the system as thus far described, to effect a dispensing of liquid from a tank truck, the handle 85 associated with the hose valve 53 is manually swung to its valve opening position, which at the same time that it opens the hose valve 53, will cause the pressure equalizing valve assembly to function and close the pressure equalizing passageway 59. Thereafter, should an accumulation of air in the float housing cause the float valve to seat, flow of liquid through the discharge hose will cease by reason of the creation of subatmospheric pressure below the float valve and the rest of the system on the down stream side. So long as the hose valve is held open, this condition will prevail and the system cannot dispense liquid even though the condition prevailed long enough for any air in the system up to the float might dissipate itself back to the truck tank.

Upon releasing the valve control handle and permitting the hose valve to close, which at the same time will cause the pressure equalizing valve to open and provide communication between the float housing and the fitting chamber, some of the air which has accumulated in the float housing may flow into the fitting chamber to equalize pressure throughout this portion of the system, since the meter, due to manufacturing tolerances, will permit such equalization, or if of the reversible type, reverse movement of the rotor will accomplish the same result. Such equalization would permit lifting of the float valve from its seat, even in the presence of only a small quantity of liquid. Under these conditions air in quantity could slip through the meter, so it becomes incumbent to first assure dissipation of the air in the float chamber, before permitting the float valve to rise off its seat.

This I provide for by delaying equalization of pressure via the pressure equalization passage until any air in the system up to the float has had an opportunity to dissipate itself back through the system to the truck tank and be displaced by liquid from such tank. Under these conditions only liquid can reach the meter upon unseating the float valve, and upon manually opening the discharge hose valve and blocking the pressure utilizing passageway, discharge of liquid through the hose 51 can again be undertaken.

To assure sufficient time for such dissipation of the air, and thereby prevent any air from gaining access to the meter, I provide for adjusting the flow resistance of the pressure equalizing passageway by means of an adjustable constriction in the said passageway, which may be adjusted until the proper time element for such dissipation of accumulated air is realized.

Such adjustable constriction may take the form of a screw 101 threaded through the arm 63 of the pressure equalizing valve assembly housing 65 across the passage 71 therein, preferably in slightly offset relationship thereto. That portion of the screw exposed in the passage is ground down to its diameter, whereby upon rotation of the screw, the passage may be adjustably constricted from substantially half its full cross-section to a point where it will be substantially though not completely blocked.

To discourage tampering with this screw adjustment, a headed screw closure 103 is threaded into the opening.

From the foregoing description of my invention in its preferred form, it will be apparent that the same fulfills all the objects attributed to the invention, and while I have illustrated and described the invention in its preferred form, it will be apparent that the same is subject to alteration and modification without departing from the underlying principles involved, and I, accordingly, do not desire to be limited in my protection to the specific details so illustrated and described, except as may be necessitated by the appended claims.

I claim:

1. A liquid metering system comprising a liquid meter having an intake opening and a discharge opening; an air separator coupled to the intake side of said meter, said air separator including a float housing and providing a flow passageway to said meter, a valve seat in said float housing transversely of said passageway, a float valve assembly in said float housing involving a float and valve adapted to seat upon said valve seat and close said passageway upon lowering of said float with drop of liquid level in said float housing in response to accumulation of air in said float housing; a hose fitting coupled to the discharge side of said meter, said fitting defining a chamber having an opening for connection of a hose thereto, a valve in said fitting chamber adapted to block flow through said opening; a pressure equalizing passageway connecting said float housing and said fitting chamber, a pressure equalizing valve assembly including a valve normally blocking said pressure equalizing passageway; means for opening and closing said fitting chamber valve, while closing and opening said pressure equalizing valve; and means for delaying equalization of pressure and resulting lifting of said float valve until accumulated air in said float housing has substantially dissipated itself from said housing.

2. A liquid metering system comprising a liquid meter having an intake opening and a discharge opening; an air separator coupled to the intake side of said meter, said air separator including a float housing and providing a flow passageway through said separator to said meter, a valve seat in said float housing transversely of said passageway, a float valve assembly in said float housing involving a float and valve adapted to seat upon said valve seat and close said passageway upon lowering of said float with drop of liquid level in said float housing in response to accumulation of air in said float housing; a hose fitting coupled to the discharge side of said meter, said fitting defining a chamber having an opening for connection of a hose thereto, a valve in said fitting chamber adapted to block flow through said opening; a pressure equalizing passageway connecting said float housing and said fitting chamber, a pressure equalizing valve assembly including a valve normally blocking said pressure equalizing passageway; means responsive to closing of said fitting chamber valve, for opening said pressure equalizing valve; and means responsive to opening of said fitting chamber valve for closing said pressure equalizing valve; said pressure equalizing passageway, upon opening of said pressure equalizing valve assembly, having flow resistance sufficient to delay pressure equalization and resulting lifting of said float valve, until accumulated air in said float housing has substantially dissipated itself from said housing.

3. A liquid metering system comprising a liquid meter having an intake opening and a discharge opening; an air separator coupled to the intake side of said meter, said air separator including a float housing and providing a flow passageway to said meter, a valve seat in said float housing transversely of said passageway, a float valve assembly in said float housing involving a float and valve adapted to seat upon said valve seat and close said passageway upon lowering of said float with drop of liquid level in said float housing in response to accumulation of air in said float housing; a hose fitting coupled to the discharge side of said meter, said fitting defining a chamber having an opening for connection of a hose thereto, a valve in said fitting chamber adapted to block flow through said opening; a pressure equalizing passageway connecting said float housing and said fitting chamber, a pressure equalizing valve assembly including a valve normally blocking said pressure equalizing passageway; means for opening and closing said fitting chamber valve, while closing and opening said pressure equalizing valve; and means for adjusting the flow resistance of said pressure equalizing passageway.

4. A liquid metering system comprising a liquid meter having an intake opening and a discharge opening; an air separator coupled to said meter about its intake opening, said air separator including a float housing and a strainer housing, together providing a flow passageway through said separator to said meter, a strainer in said strainer housing, a valve seat in said float housing transversely of said passageway, a float valve assembly in said float housing involving a float and valve adapted to seat upon said valve seat and close said passageway upon lowering of said float with drop of liquid level in said float housing in response to accumulation of air in said float housing; a hose fitting coupled to said meter about the meter discharge opening, said fitting defining a chamber having an opening for connection of a hose to said fitting, a valve in said fitting chamber adapted to seat across and block said opening; a pressure equalizing passageway connecting said float housing and said fitting chamber, a pressure equalizing valve assembly including a valve normally blocking said pressure equalizing passageway; means responsive to closing of said fitting chamber valve for opening said pressure equalizing valve; and means responsive to opening of said fitting chamber valve for closing said pressure equalizing valve; said pressure equalizing passageway, upon opening of said pressure equalizing valve assembly, having flow resistance sufficient to delay pressure equalization and resulting lifting of said float valve, until accumultaed air in said float housing has substantially dissipated itself from said housing.

5. A liquid metering system comprising a liquid meter having an intake opening and a discharge opening, each bounded by a flange; an air separator coupled to said meter about its intake opening; said air separator including a float housing and a strainer housing, together providing a flow passageway through said separator to said meter, a strainer in said strainer housing, a valve seat in said float housing transversely of said passageway, a float valve assembly in said float housing involving a float and valve adapted to seat upon said valve seat and close said passageway upon lowering of said float with drop of liquid level in said float housing in response to accumulation of air in said float housing; a hose fitting coupled to said meter about the meter discharge opening, said fitting defining a chamber having an opening for connection of a hose to said fitting, a valve in said fitting chamber adapted to seat across and block said opening; a pressure equalizing passageway connecting said float housing and said fitting chamber, a pressure equalizing valve assembly including a valve normally blocking said pressure equalizing passageway; means responsive to closing of said fitting chamber valve, for opening said pressure equalizing valve; means responsive to opening of said fitting chamber valve for closing said pressure equalizing valve, and means for adjusting the flow resistance of said pressure equalizing passageway.

References Cited in the file of this patent
UNITED STATES PATENTS

| | | |
|---|---|---|
| 2,263,145 | Smith | Nov. 18, 1941 |
| 2,697,943 | Pressler | Dec. 28, 1954 |